United States Patent [19]
Brownlie et al.

[11] Patent Number: 5,623,516
[45] Date of Patent: Apr. 22, 1997

[54] FRAME SYNCHRONIZATION FOR QAM

[75] Inventors: John D. Brownlie; Richard G. Williams, both of Suffolk, England

[73] Assignee: British Telecommunications public limited company, London, England

[21] Appl. No.: 122,525

[22] PCT Filed: Mar. 27, 1992

[86] PCT No.: PCT/GB92/00563

§ 371 Date: Sep. 28, 1993

§ 102(e) Date: Dec. 1, 1993

[87] PCT Pub. No.: WO92/17972

PCT Pub. Date: Oct. 15, 1992

[30] Foreign Application Priority Data

| Mar. 28, 1991 | [GB] | United Kingdom | 9106658 |
| Apr. 26, 1991 | [GB] | United Kingdom | 9109006 |
| Jun. 7, 1991 | [GB] | United Kingdom | 9112316 |
| Oct. 15, 1991 | [GB] | United Kingdom | 9121881 |
| Oct. 16, 1991 | [GB] | United Kingdom | 9121985 |
| Oct. 28, 1991 | [GB] | United Kingdom | 9122822 |

[51] Int. Cl.⁶ ............................................. H04L 27/00
[52] U.S. Cl. .................... 375/259; 375/330; 375/340; 370/207; 370/509; 329/304
[58] Field of Search ........................... 375/39, 84, 83, 375/94, 59; 370/82; 371/46; 329/304, 307

[56] References Cited

U.S. PATENT DOCUMENTS

| 3,955,141 | 5/1976 | Lyon et al. . | |
| 4,597,090 | 6/1986 | Forney, Jr. | 375/39 |
| 4,641,327 | 2/1987 | Wei | 375/114 |
| 4,713,817 | 12/1987 | Wei . | |
| 4,837,766 | 6/1989 | Yoshida . | |
| 4,899,367 | 2/1990 | Sampei . | |
| 5,048,056 | 9/1991 | Goldstein | 375/39 |
| 5,150,381 | 9/1992 | Forney, Jr. et al. . | |
| 5,214,672 | 5/1993 | Eyuboglu et al. . | |

FOREIGN PATENT DOCUMENTS

| 0122305 | 10/1984 | European Pat. Off. . |
| 0229923 | 11/1985 | European Pat. Off. . |
| 0282298 | 9/1988 | European Pat. Off. . |
| 0383632 | 8/1990 | European Pat. Off. . |
| 0392723 | 10/1990 | European Pat. Off. . |
| 0406507 | 1/1991 | European Pat. Off. . |

OTHER PUBLICATIONS

Michael D. Rauchwerk, "A Technique for multidimensional symbol & multiplexing frame synchronization in multidimensional trellis coded modems using non-standard Baud" 1988 I.E.E.E. International Conference on Communications '88 p. 80.4 vol. 1 of 3 vol. Philadelphia PA 12–15 Jun. 1988.

Forney, "Multidimensional Constellations—Part II: Voronoi Constellations", IEEE Journal On Selected Areas in Communication, vol. SAC-7, No. 6, Aug. 1989, New York US, pp. 941–958.

Forney, Jr., "Trellis Shaping: IEEE Transactions On Information Theory", vol. 38, No. 2, Mar. 1992, pp. 281–300.

Calderbank et al, "Nonequiprobable Signaling on the Gaussian Channel", IEEE Transactions On Information Theory 36 (1990) Jul., No. 4, New York US, pp. 726–740.

(List continued on next page.)

Primary Examiner—Stephen Chin
Assistant Examiner—Bryan E. Webster
Attorney, Agent, or Firm—Nixon & Vanderhye P.C.

[57] ABSTRACT

Frame synchronization for data transmitted using quadrature amplitude modulation is achieved by providing that one symbol per frame is chosen from a larger signal point constellation than the remaining symbols. Thus, bits are assembled into groups of unequal size to control the mapping between the data and the signal points. Where constellations having a number of points not equal to a power of two, these may be coded in groups; or the data may be converted into a mixed-base number the bases of which correspond to the number of points in the respective constellations.

23 Claims, 3 Drawing Sheets

OTHER PUBLICATIONS

Forney, Jr., "Multidimensional Constellations—Part I: Introduction, Figures of Merit, and Generalized Cross Constellations", IEEE Journal On Selected Areas In Communications, vol. SAC–7, No. 6, Aug. 1989, New York, pp. 877–892.

CCITT Study Group Papers, "Constellation And Symbol Mapping", D133, pp. 1–7, Genova, 29 Oct.–6 Nov. 1991.

CCITT Study Group Papers, "Additional Details On AT&T's Candidate Modem For V.fast", D 157, pp. 1–6, 29 Oct.–6 Nov. 1991.

Cusack, Electronic Letters, vol. 20, No. 2, pp. 62–63, Jan. 1984.

Ungerboeck, IEEE Communications Magazine, vol. 25, No. 2, pp. 12–21, Feb. 1987.

IEEE Transaction on Communications, vol. COM–34, No. 10, Oct. 1986.

FRAME SYNCHRONIZATION FOR QAM

RELATED APPLICATIONS

This application is related to commonly assigned U.S. patent application Ser. No. 08/030,232 filed Mar. 22, 1993 entitled CODED QAM SYSTEM and naming Richard G. Williams and John D. Brownlie as inventors. Priority rights and benefits under 35 U.S.C. §120 and 35 U.S.C. §365 are hereby claimed.

BACKGROUND OF THE INVENTION

1. Field of the Invention

The present invention is concerned with modulation schemes for the transmission of digital data, more specifically those using quadrature amplitude modulation (QAM) in which the transmitted signal consists of a series of discrete signal portions ("symbols") in each of which a carrier assumes a selected phase and amplitude. More specifically, the phase and amplitude of a symbol are constrained to be equal to a selected one of a set of phase/amplitude combinations. This set is usually referred to as a "constellation" and may be depicted graphically as a set of points on a plot in which cartesian coordinates represent in-phase and quadrature components (or polar coordinates represent phase and amplitude).

2. Related Art

In the simplest of such systems, the number of points in the (single) constellation is a power of two (e.g. $2^n$) and each group of n bits to be transmitted selects the point for each symbol (where each symbol thus carries n bits). In more sophisticated systems additional bits may be generated by redundant-coding process; as a result (or otherwise) the number of bits to be carried per symbol may be non-integer, and bits to be carried by a number of symbols need to be processed together. Such an arrangement results in a framing structure for the transmitted signal and necessitates provision for frame synchronisation in order that the symbols can be correctly interpreted at a receiver. Alternatively (or in addition) the data to be sent may have an inherent framing structure so that synchronisation is required for the data to be correctly processed at a receiver.

BRIEF SUMMARY OF THE INVENTION

According to the present invention there is provided an apparatus for transmission of data using quadrature amplitude modulation comprising:

(a) modulation means controllable to produce consecutive output symbols in each of which a carrier has selected phase and amplitude;

(b) mapping means for receiving the data and controlling the modulation in accordance with a first signal point constellation having a plurality of signal points some of which, on a polar plot lie outside a predetermined boundary and others of which lie within it, and one more further constellation(s) which has or have points fewer in number than those of the first constellation and which lie within the said predetermined boundary;

(c) frame synchronisation means operable in accordance with a predetermined framing structure of the transmission so to control the mapping means that, for each symbol to be transmitted in one predetermined position of a frame, the symbol is chosen from the first constellation, other symbols of the frame being chosen from the further constellation(s).

The other symbols may be chosen from one such further (second) constellation, however, one (or more) of them may be chosen from a third constellation having a smaller number of points than the second constellation. In this case preferably a symbol chosen from the third constellation occupies a position in the frame adjacent to that of the symbol chosen from the first constellation.

Other aspects of the invention are set out in the claims.

BRIEF DESCRIPTION OF THE DRAWINGS

Some embodiments of the invention will now be described, by way of example with reference to the accompanying drawings, in which.

DETAILED DESCRIPTION OF EXEMPLARY EMBODIMENTS

Figure 1:
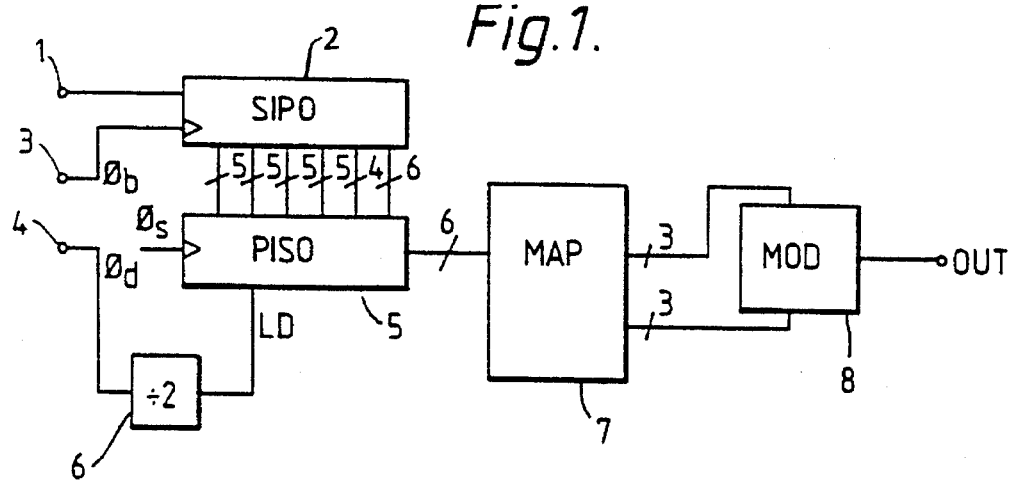
FIG. 1 is a block diagram of a first embodiment of coding apparatus according to the invention.

Referring to FIG. 1, a modulation apparatus has an input 1 and a 30-it serial-in/parallel-out shift register 2 for receiving, in serial form, data bits to be transmitted. Inputs 3 and 4 receive a bit clock signal $\phi_b$ and a data framing clock $\phi_d$: it is assumed in this example that the data have an inherent framing structure of 15 bits —i.e. a receiver needs information as to the positions of the bits relative to the framing clock $\phi_d$ in order to interpret them. We assume, further that we choose a symbol rate such that there are an average of 5 bits/symbol. Synchronization information is to be sent by the expedient of ensuring that each frame of symbols to be transmitted contains one symbol chosen from a first, large, constellation and further symbols chosen from a second, smaller constellation.

Necessarily a frame of symbols must represent a whole number of data frames and, supposing that the number is two, a symbol frame contains 6 symbols, viz:

one (synchronisation) symbol, carrying 6 bits, chosen from a first, 64-point, constellation four symbols, carrying 5 bits each (20 in total), chosen from a second, 32-point, constellation;

one symbol carrying 4 bits, chosen from a third, 16-point, constellation, i.e. a total of 30 bits.

Figure 2:
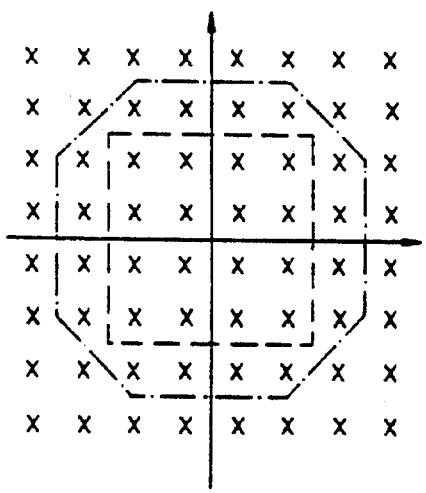
FIG. 2 is a phase diagram showing constellations for use with the apparatus of FIG. 1.

Suitable constellations are shown in a phase diagram, FIG. 2. The first constellation includes all the points on the diagram; the second, only those within the dot-dash line, and the third, only those within the broken line. In this case, each larger constellation includes all the points of the next smaller one; this is by far the most convenient arrangement but others are possible though clearly it is desirable that the inter-point distances are similar for all constellations. The first constellation, to be used for synchronisation, has half its points inside and half of them outside a predetermined boundary represented by the dot-dash line, whilst the points of the others lie inside it.

Returning to FIG. 1, the bits output from the shift register 2 are formatted as one six-bit word, one four-bit word and four five-bit words; these are loaded into a six-bit wide parallel-in/serial-out shift register 5 by pulses $\phi_d/2$ obtained from $\phi_d$ by a divide-by two circuit 6 (the missing most significant bits set to zero) and clocked out a word at a time by symbol rate pulses $\phi_s$ to access a mapping unit 7 in the form of a read-only memory which responds to the input to produce a pair of three-bit coordinate values which are supplied as in-phase and quadrature values to a carrier modulator 8. The mapping represented by the stored values in the memory 7 is such that when the most significant address bit is zero, only points within the dot-dash line in FIG. 2 are selected, and when the most significant two bits are zero, only points within the broken line in FIG. 2 are selected.

Note that the synchronising symbol occupies the first position within the symbol frame (though any predetermined position is satisfactory) and that the symbol selected from the third constellation follows it. It is not essential to the method that the third constellation size should be used at all—an extra bit could be carried by allowing all symbols but the synchronising symbol to be selected from the 32-point constellation—but it can be advantageous in that if it is transmitted consecutively (before or after) with the synchronising symbol then following transmitter filtering this juxtaposition can serve to reduce the peak to mean power ratio of the transmitted signal.

Note also that since half the points are outside the dot-dash boundary in the phase diagram then (assuming random data) on average half the synchronising symbols result in transmission of one of these "outer" points and may readily be recognised as such at a receiver. Preferably (as here) these outer points all have a higher power than any of those within the boundary, but this is not essential. A receiver may also use as a check that the second symbol of the frame does not lie outside the broken-line boundary to verify the validity of a synchronising symbol.

In the above example there is no reason why some of the input bits could not have been processed via a conventional scheme such as convolutional or block coding to increase system performance; the synchronisation method is unaffected. However in that case the mapping unit 7 should be such as to map the coded bits (which would be connected to form the least significant bits of the words supplied to the mapping unit) onto the signal constellation in the manner required by such schemes. Also—as mentioned above—the number of symbols chosen from the second and third constellations may be varied to achieve desired bit rates. Constellation-switching systems of this kind are discussed in our International patent application No ........... (having the same filing date as the present application and claiming the priority of the following UK patent applications: 9106658.9 of 28 Mar. 1991; 9106006.8 of 26 Apr. 1991; and 9112316.6 of 7 Jun. 1991), referred to below as "our co-pending international application".

The embodiment of FIG. 1 is relatively simple in that the constellations all have a number of points equal to a power of two. Where this is not so, the carrying capacity of a symbol is of course a non-integral number of bits, and generally some common processing of a group of bits, corresponding to a group of symbols, is necessary in order to generate the coordinates of the symbols for controlling a modulator.

There are basically two approaches to this problem.

In the first (see for example European patent publication number 0122805A), k+½ bits per symbol are carried by a constellation having 1½×$2^k$ (greater than $2^{k+½}$) points; these are regarded as comprising $2^k$ "inner" points and $2^{k-1}$ "outer" points. 2k+1 bits are coded onto two symbols by providing that one bit determines whether any of the outer $2^{k-1}$ points will be chosen; if not then the remaining 2k bits permit two one-from-$2^k$ selections. In the other case a second bit selects which symbol is chosen from the outer points and the remaining 2k−1 bits provide a one-from-$2^k$ selection on one symbol and one-from-$2^{k-1}$ selection from the other. This is generalised to coding k+1/h bits per symbol (where h=$2^t$ is a power of two) using a constellation of (1+1/h)$2^k$ points, blocks of hk+1 input bits being processed together to produce h symbols. One bit determines whether any symbol will carry an outer point; if so then t bits determine which one symbol will do so and k−t bits determine the outer point. The remaining (h−1)k bits determine the (inner) point to be used for the remaining h−1 symbols. If no outer point is carried, then the remaining hk bits select one inner point for each symbol.

As a general observation, it is in fact unnecessary that the division of the constellation into smaller and larger sets of points be performed in any particular way; but since the smaller set is used by (at most) only one symbol of the pair, then for keeping the mean power low, choosing this see from outer points of the constellation is obviously advantageous.

The second embodiment envisages that the (first) constellation to be used for the synchronising symbol has a number of points equal to a power of two (e.g. $2^{k+1}$) and that a transmitted frame also contains symbols chosen from a second constellation having 1.5×$2^k$ points (necessarily an even number). In this case (assuming as before that the synchronising symbol occupies the first position of a frame) one proceeds as in FIG. 1 save that the mapping of the second and subsequent symbols is performed on symbol pairs in the above-described manner. If desired a third, smaller constellation e.g. of $2^k$ points may also be used—preferably consecutively with the synchronising symbol, for the reasons discussed earlier.

Figure 3:
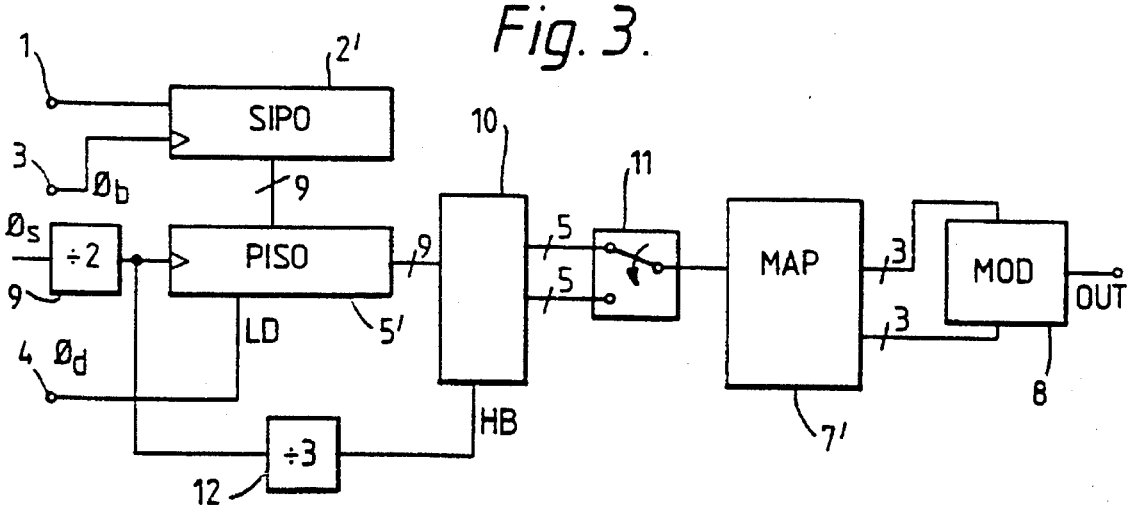
FIG. 3 is a block diagram of a second embodiment of coding apparatus according to the invention.

FIG. 3 shows the apparatus of FIG. 1 modified to produce a frame of six symbols; one each from 16- and 32-point constellations and four from a 24 point constellation. Equivalent parts are given the same reference numerals, parts performing a similar function by the same numerals with primes ('). Here there is only one data frame (of 27 bits) per symbol frame, 6 symbols in length, and the divider 6 is absent. The 27 bits assembled in the register 2' are passed nine (i.e. two symbols worth) at a time to a nine-wide 3-stage shift register 5'. Symbol clock pulses φs are divided by two in a divider 9 for clocking the register 5'.

Figure 4:
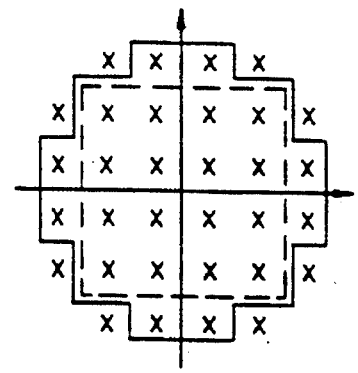
FIG. 4 is a phase diagram showing constellations for use with the apparatus of FIG. 3.

FIG. 4 shows a suitable set of constellations for this embodiment.

Each set of 9 bits (labelled a0 . . . a8) output by the shift register 5' is fed via a logic gate arrangement 10 having output bits b0 . . . b9 and a distributor 11 which conducts bit groups b5–b9 and b0–b4 respectively in succession to a mapping unit 7' and the modulator 8.

Figure 5:
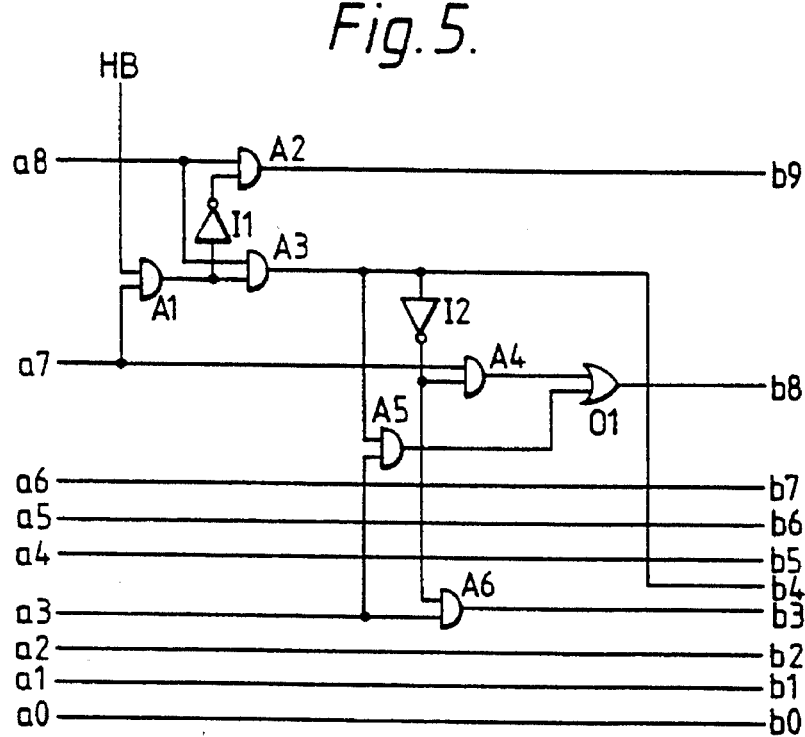
FIG. 5 is a logic circuit for part of the apparatus of FIG. 3.

The gate arrangement 10 (shown in detail in FIG. 5) has and-gates A1 . . . A6, inverters I1, I2 and an or-gate O1. Its operation is most easily appreciated by noting that as long as b4 is 0 then the and-gates A4, A6 are enabled and A5 disabled so that bits a0–a3 pass directly to b0–b3 and a4–a7 pass directly to b5–b8. During the first two symbol periods a signal HB (from a+3 circuit 12) is low and enables A2 and disables A3 so that b9=a8 and b3=0. Thus bits b5–b9 (=a4–a8) select a point from the full constellation for the synchronising symbol and bits b0–b3 (=a0 to a3) select a point from the inner 16-point constellation (since a4=b4 =0). On subsequent symbol pairs HB=1. If a8=0 gates A2, A3 are disabled so that b9=b4=0 and bits b5–b8 (=a4–a7) and b0–b3 (=a0–a3) select two symbols form the inner 16 points. If on the other hand a8=1, A2, A3 are enabled and if bit a7 is 0 then b9=1 and b4=0 with the result that b5–b7 (=a4–a6) select one of the eight intermediate points of FIG. 4 (as b9=1 and b8=a7=0) for the first symbol of the pair and b0–b4 (=a0–a3) select from the inner sixteen for the second; whilst if bit a7 is 1 then b9=0 and b4=1. Then b5–b8 (=a4–a6 and a3 since A4 is disabled in favour of A5) select from the inner sixteen for the first symbol and b0–b2 (=a0–a2) select one of the eight intermediate points for the second symbol (as b4=1 and b3 is set to 0 by the and-gate A6).

If it is desired to use this system with the constellation-switching as envisaged in our co-pending International application, then the arrangement of FIG. 3 may be readily modified/or switched, in a multi-standard system) to accommodate this.

The original scheme required a total of A symbols of which d symbols were chosen from a larger constellation and the remainder from the smaller. We suppose that the larger constellation has $1.5 \times 2^k$ points, the smaller $2^k$ (k integer). In this instance d is always even; we elect to put a pair of these symbols (carrying 2k+1 bits) in the first and second positions within the frame. Instead of each symbol carrying k+½ bits, however, in the present proposal the symbol in the first position carries k+1 bits and that in the second position carries k bits: i.e. the first-position symbol is drawn from a $2^{k+1}$-point constellation and the second-position symbol from a $2^k$-point constellation.

Thus we have:
one (first) symbol from a $2^{k+1}$-point constellation;
d-2 (second) symbols from a $1.5 \times 2^k$-point constellation;
A-d+1 (third) symbols from a $2^k$-point constellation.

Note that necessarily d>2 for a non trivial result and that (unlike the situation in our previous application) the situation d=A is possible.

A third embodiment of the invention again follows the first approach referred to, but envisages that the synchronising symbol is drawn from a constellation having $1.5 \times 2^k$ points. Supposing constellation-switching, then two constellations are used for the remaining points, of which the larger constellation has $2^k$ points and the smaller has $0.75 \times 2^k$ points. We elect to put a pair of the d symbols in the first and second positions of the frame (necessarily d≧2): originally they would have carried k bits each (total 2k). However in order to achieve synchronisation the symbol in the first position carries k+½ bits and that in the second position carries k–½. Thus the first-position symbol is drawn from a $1.5 \times 2^k$-point constellation and the second-position signal from a $0.75 \times 2^k$-point constellation.

Thus we have:
one (first) symbol from a $1.5 \times 2^k$-point constellation;
d-2 (second) symbols from a $2^k$-point constellation;
A-d+1 (third) symbols from a $0.75 \times 2^k$-point constellation.

The coding of the 2k bits onto the synchronising pair is performed in a manner analogous to the coding of an odd number of bits onto a symbol pair described in our previous application. Suppose, for clarity, k is 4. Then we have eight bits to code, one symbol to be chosen from a 24-point constellation and one symbol to be chosen from a 12-point constellation. The constellations are regarded as having 16 (or 8) points constituting a first plurality of points and 8 (or 4) points constituting a second plurality of points. Preferably, though not necessarily, the points of the second plurality are located, on the phase diagram, outside the first plurality. As before, one bit determines whether inner or outer points are to be employed: if inner then the first symbol carries four bits and the second three, making a total of eight bits. If outer points are to be employed, then a second bit selects whether it is the outer points of the first or the second symbol that are to be used: in the former case the two symbols carry three bits each whilst in the second case the first symbol carries four bits and the second carries two bits.

Note in this case that both the end conditions d=2 and d=A are possible, though with a realistic frame length both conditions are unlikely to apply simultaneously. Note also that the "paired" coding of symbols from non-power of two constellations of different sizes may be of value in other situations too.

Note also that this embodiment, in which symbols drawn from a $0.75 \times 2^k$ constellation (carrying k–½ bits) and a $1.5 \times 2^k$ point constellation (carrying k+½ bits) may be coded as a pair, is illustrative of the more general proposition that symbols from $1.5 \times 2^p$ and $1.5 \times 2^q$-point constellations (carrying p+½ and q+½ bits respectively) may be coded as a pair for any integers p and q; or indeed that symbols drawn from $(1+\frac{1}{2^t}) \times 2^{p_i}$-point constellations (carrying $p_i + \frac{1}{2^t}$ bits) may be coded as a group of $2^t$ symbols for any see of integers $p_i$ (i=1 ... $2^t$).

It will be seen that this first approach does not guarantee the appearance of a symbol having a larger than normal power in the first (synchronising) position; the probability of such a symbol (for t=1 and "outer" points) is 25%. However this ensures the relatively frequent appearance of such a symbol: if synchronisation is lost a receiver can detect a symbol lying outside the 'normal' large constellation and initiate a resynchronisation procedure.

Although this process requires a symbol of larger than normal power to be transmitted, it is always paired with a small symbol. If, as is preferred, they are transmitted consecutively, then this (following transmit filtering) serves to mitigate the mildly detrimental effect which the increase in peak power has on transmission links employing nonlinear digital representations (such as a A-law/μ-law encoder). If the frame length is 30 symbols, a typical penalty in transmit power would be 0.03 dB. This penalty could be reduced by reducing the rate of appearance of synchronising symbols but this would naturally increase the resynchronisation time at the receiver.

As noted above, this first approach is equally applicable to coding k+1/h bits per symbol using a constellation of $(1+1/h)2^k$ points, where h is a power of two, moreover it can be extended to other non-integer numbers of bits by noting that the process can be repeated so that k+¾=k+½+¼ bits per symbol can be transmitted using a constellation of $(1+½)(1+¼) 2^k$ points.

The basic idea behind the second approach involves using, for b bits per symbol (b non-integer) a constellation having m points where m is the smallest integer which is greater than or equal to $2^b$. Often this results in a smaller constellation than with the first approach. Then a group of D symbols can be produced by taking Db bits (Db being integral) and, regarding this as a Db-bit binary number, and expressing it as a D-digit number base m. Each digit of this number has a range of (at most) 0 to m–1 (the most significant digit will usually not reach up to m–1) and can select, for a respective symbol, a point from the m-point constellation. A variant of this idea permits the constellation to be partitioned into subsets or regions each having a number of points equal to a power of two. The number of bits/symbol is expressed as k+b (k integer, b non integer)

and m is then $2^k$ times the smallest integer greater than or equal to $2^b$ Obviously this often gives a larger value of m since the rounding overhead is now in the range +0 to $2^k(1-0)$ rather than +0 to (1-0), but is convenient in for example permitting coded bits to be appropriately mapped onto the subsets.

To give a numerical example, suppose 19.2 kb/s of information are to be transmitted at 3200 baud (i.e. 6 information bits/symbol) and that 3 bits per two symbols are coded by a convolutional coder to produce four. Thus the total number of bits per symbol to be transmitted is 6½. A constellation is divided into four subsets to be chosen by the two coded bits per symbol (i.e. k=2). The total number of bits/symbol is 6.5=2+4.5 (i.e. b=4.5). It follows that $2^b=22.6$ so m=23 and the constellation has therefore a total of 23×4=92 points. Taking two symbols we have 9 uncoded bits. The 9 bits represent a binary number in the range 0- to $511_{10}$ which are converted into a two digit base 23 number in the 0 to (22) $(6)_{23}$. For each symbol, two of the coded bits identify the subset and the relevant digit of the base-23 result identifies the specific point within that subset. If one decides to increase the number of subsets to 16, then k=4, b=2.5, $2^b=5.65$ and m=6; the constellation has 6×16=96 points.

It will be observed that these systems using non-power of two constellations inherently involve pairing or grouping of symbols in the mapping process and thus synchronisation is essential even if coding or data considerations do not require it.

The provision of synchronisation in systems of this type will be described for one subset. As before, one symbol, to be used for synchronisation, is to be selected from a larger than normal constellation. Suppose that the number of bits per "normal" symbol is b and the number of bits per "large" symbol is b+x where x is typically some fractional value. Then the normal constellation will have $m_0$=Intg $[2^b]$ points and the larger constellation $m_+$=Intg $[2^{b+x}]$ where the operator "Intg []" is defined as 'the smallest integer greater or equal to'. One may also elect to define a "small" constellation having m=Intg $[2^{b-x}]$.

Suppose that a symbol frame includes a number of data frames of D symbols each and that one (e.g. the first) data frame is to contain a synchronising symbol.

In the non-synchronised data frames the constellation size is Intg $[2^b]$. In the first data frame we have one symbol carrying b+x bits, D-2 symbols carrying b bits and one symbol carrying b-x bits.

The base conversion referred to earlier now becomes one of conversion to a mixed-based system (mixed based systems will be familiar to those accustomed to measurement in feet and inches). The Db bit input needs to be converted into a D digit number having one digit at base $m_+$=Intg $[2^{b+x}]$, (D-2) digits at base $m_0$=Intg $[2^b]$ and one digit at base m=Int $[2^{b-x}]$.

For example, if x=¼ and 4 symbols are to carry 21 bits per subset, then
b=5.25,
$m_o$=Intg $[2^{5.25}]$=39
$m_+$=Intg $[2^{5.5}]$=46
$m_-$=Intg $[2^5]$=32

So the 21 bits, considered as a binary number (0 ... $2097151_{10}$) are expressed as a number with one digit base 46, two digits base 39, and one digit base 32. It is preferred that the base 46 number is the least significant digit and, as previously, that the "larger" and "smaller" symbols are consecutively transmitted. Assuming that the least significant digit but one is to base 32, then the range is 0 to $[36]_{39}$ $[20]_{39}$ $[22]_{32}[11]_{46}$.

The above example assumes that the number of bits per data frame (4 symbols) is constant whether or not a synchronisation symbol is included, and the "normal" constellation is unchanged. The extra bit-carrying capacity of the "larger than normal" symbol is reflected in the appearance of a "smaller than normal symbol". Without these constraints the extra capacity could be used to enable a smaller constellation to be used for all the remaining symbols of the frame.

If (with the same basic figures), the largest constellation is fixed at 46, and carries 5.5 bits then the number of bits to be carried by the remaining three symbols is 15.5—i.e. 5⅙ bits/symbol. The required uniform symbol size is $m_0$=Intg $[2^{31/6}]$=36.

Alternatively, if we decide that the bit capacity of the three symbols is b' and that of the synchronised symbol is b'+0.25, then b'+0.25+3b'=21; b'=20.75/4=5.1875. Intg $[2^{b'}]$=Intg $[2^{5.1875}]$=37; Intg $[2^{b'+0.25}]$=Intg $[2^{5.4375}]$=44 and the constellation sizes are 44 and 37.

Figure 6:
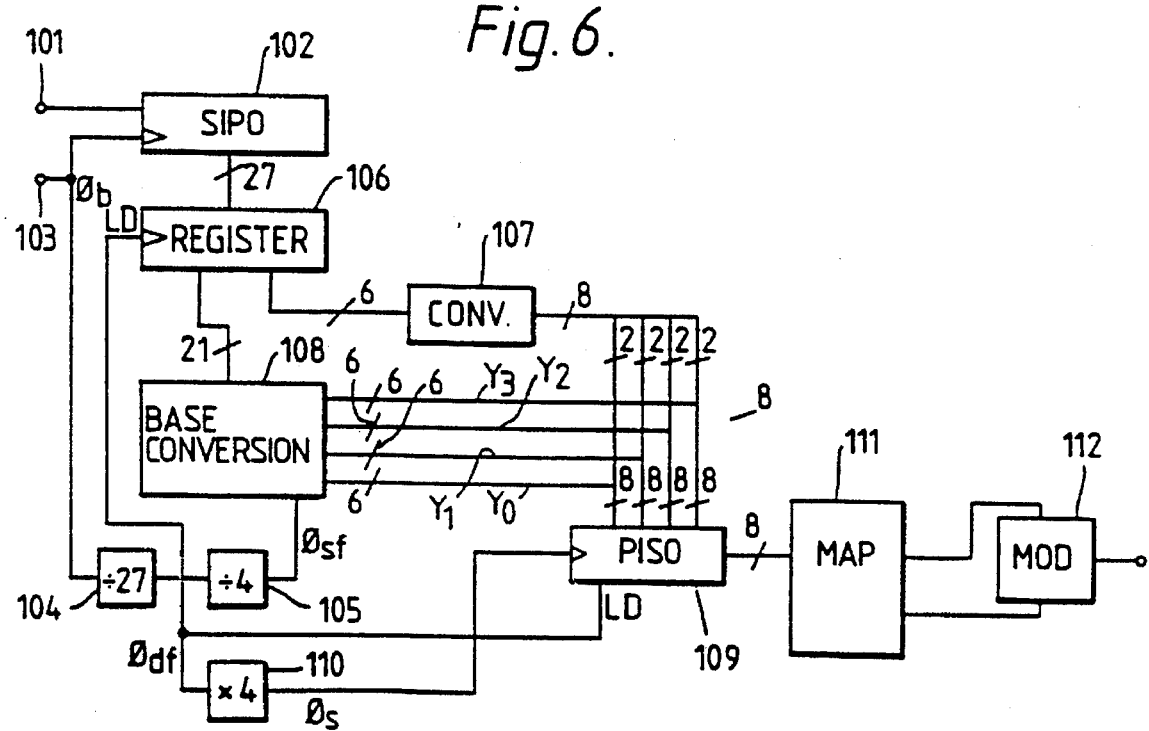
FIG. 6 is a block diagram of a third embodiment of coding apparatus according to the invention.

It is observed if the smallest constellation (m) were selected for the most significant digit then the value of that digit would be $29_{10}$ and this would in fact be true whether the base is m or m: i.e. the shrinking of one symbol's constellation to offset the enlargement of another is then not explicitly necessary in that the numerical range of the most significant digit would shrink anyway. However of course the shrinking of the number range per se may or may hoe result in a reduction of power for that symbol, depending on how the number range is mapped to the points of the constellation. An apparatus for implementing this synchronisation proposal is depicted in FIG. 6. Successive data frames of 27 bits each are clocked into a 27-bit serial-in/parallel-out input shift register 102 by bit clock pulses $\phi_b$ received at an input 103. These pulses are divided by 27 in a divider 104 in order to produce data frame clock pulses $\phi_{df}$ and the latter (assuming a synchronising symbol is required for one in four data frames) further divided by four in a divider 105 to produce pulses $\phi_{sf}$ which are high during the first data frame and low during the other three. The 21 bits are, once per frame, loaded into a 21-bit register 106 by pulses $\phi_{df}$. Six bits are conducted to a convolutional coder 107 which produces, for each 3 bits, four coded bits; viz 8 bits per frame. The remaining 21 bits are supplied to a base conversion unit 108. This converts the received 21-bit binary number into a mixed base four-digit number (base 39, 39, 32, 46) when $\phi_{sf}$ is high, or a four-digit number base 39 when $\phi_{sf}$ is low. Each of the four resulting digits $y_0 \ldots y_3$ is output on a respective output. The base conversion unit can conveniently be a suitably programmed microprocessor. A suitable program is set out below (in the Basic language).

```
10  'Base Conversion Program
20  '
30  BASE1 = 39       'Set Default Base
40  FOR I = 0 TO 3
50  B(I) = BASE1
60  NEXT I
70  '
80  PHISF = IN(CONTROLINPUT)    'Get Control Signal
90  W = IN(DATAINPUT)    'and Data
100 '
110 IF PHISF = 1 THEN GOTO 180   'Set mixed
    Bases for a
120 FOR I = 0 TO 3    'Synchronising symbol
130 READ B(I)
140 NEXT I
150 DATA 46, 32, 39, 39
160 '
170 FOR I = 0 TO 3
```

```
180  Y(I) = W - B(I)*INT(W/B(I))  'Digit = remainder after
                                    'division by base
200  W = INT(W/B(I))
210  NEXT I
240  FOR I = 0 TO 3
250  OUT(Y(I))      'Output the Results
260  NEXT I
280  GOTO 10        'Repeat for next Data Frame
```

The four digits are each concatenated with two bits from the convolutional coder 107 to form a symbol label and these are loaded into a 8-bit wide 4-stage parallel-in/serial-out shift register 109 and clocked out by symbol rate pulses $\phi_s$ (generated by a clock generator 110 locked to $\phi_{df}$). Each label addresses a mapping unit in the form of a read-only memory 111 which stores the coordinates of the points of 184, 156 and 128 point constellations. A modulator 112 is provided, as before.

Figure 7:
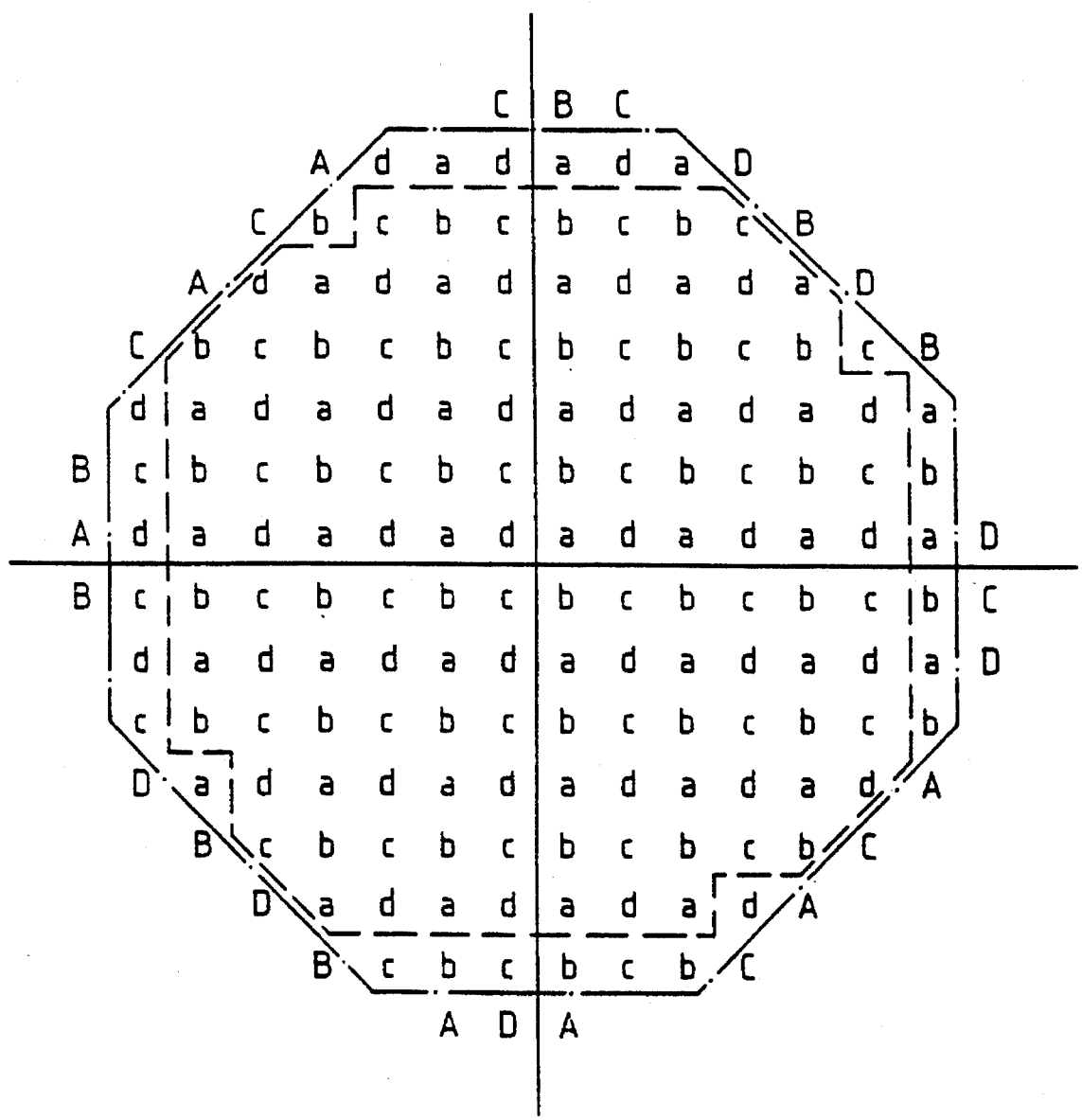
FIG. 7 is a phase diagram showing constellations for use with the apparatus of FIG. 6.

Suitable constellations are illustrated in FIG. 7; points of the four subsets are labelled a, b, c, d. As before the points of the smaller constellations are contained in the larger ones. Obviously the digit values within the broken line boundary run from 0 to 31, those between this and the chain-dot boundary from 32 to 38, and those outside the chain-dot boundary (shown with subset labels in upper case) run from 39 to 45.

It is preferable that the receiver receive the digits in order of decreasing significance as it has to process them in this order. Therefore in FIG. 6 the synchronising symbol carrying the least significant digit is the last in the data frame, and the smallest base is used for the least significant-but-one digit, so that the symbols can be transmitted in descending order of significance of the digits which they carry whilst the "large" and "small" symbols remain consecutive.

As mentioned above, it is preferred that the largest base is used for the least significant digit of the mixed base number. This is because when (as is usually the case) the range of the mixed base number exceeds the range required, the least significant digit has the most uniform distribution of numbers and therefore the points in the constellation are almost equi-probable. If the largest base were used for the most significant digit then, in general some numbers (e.g. 30, 31 in the example) will not occur at all and assuming that the numbers increase in a radial direction then two of the highest points will never be transmitted. Clearly this is undesirable since a synchronising symbol is recognisable as such only when it is chosen from an outer point of the constellation. An alternative however is to assign the highest power points of the constellation to the lowest numbers, in which case it is an advantage, in terms of frequent outer points for synchronisation that the largest base be used for the most significant digit, though of course the mean power increases. In this case the synchronising symbol is transmitted first, the next symbol carries the most significant but one digit (with the smallest base), and the remaining symbols (intermediate base) transmitted in descending order of the digits which they carry.

We claim:

1. An apparatus for transmission of data using quadrature amplitude modulation, said apparatus comprising:

(a) modulation means controllable to produce consecutive output symbols in each of which a carrier has selected phase and amplitude;

(b) mapping means for receiving data and controlling the modulation means in accordance with a first signal point constellation having a plurality of signal points, a first set of which, on a phase-plane plot, lie outside a predetermined boundary and a second set of which lie within said predetermined boundary, and at least one further signal point constellation which has signal points fewer in number than those of the first constellation and lying within said predetermined boundary; and (c) frame synchronisation means operable in accordance with a predetermined framing structure so to control the mapping means that, for each symbol to be transmitted in one predetermined position of a symbol frame, a non-redundant symbol is chosen from the first constellation, remaining symbols of the same frame being chosen from the at least one further constellation.

2. An apparatus as in claim 1 in which there are a plurality of said at least one further constellation and a plurality of the said remaining symbols in a given frame are chosen from a first one of said further constellations and at least one of the said remaining symbols in a given frame is chosen from a second one of said further constellations having a smaller number of signal points than does the first one of said further constellations.

3. An apparatus for transmission of data using quadrature amplitude modulation, said apparatus comprising;

(a) modulation means controllable to produce consecutive output symbols in each of which a carrier has selected phase and amplitude;

(b) mapping means for receiving data and controlling the modulation means in accordance with a first signal point constellation having a plurality of signal points, a first set of which, on a phase-plane plot, lie outside a predetermined boundary and a second set of which lie within said predetermined boundary, and at least one further constellation which has signal points fewer in number than those of the first constellation and lying within said predetermined boundary; and (c) frame synchronisation means operable in accordance with a predetermined framing structure so to control the mapping means that, for each symbol to be transmitted in one predetermined position of a symbol frame, a symbol is chosen from the first constellation, remaining symbols of the same frame being chosen from the at least one further constellation;

the mapping means being so arranged that the said remaining symbols of a given frame comprise a plurality of symbols, even in number, chosen from a first further signal point constellation including a first plurality of signal points which is a power of two in number and a second plurality of signal points which is in number 1/h times as many as the first plurality of signal points, where h is a power of two, the said remaining symbols being coded in blocks of h symbols such that, each block contains at most one symbol chosen from the second plurality of signal points, and in which the first plurality of signal points has a number of signal points equal to twice the number in the said second plurality of signal points.

4. An apparatus as in claim 3 in which h=2.

5. An apparatus as in claim 3 in which one of the first and second sets of signal points of the first signal point constellation has a higher average power than the other set.

6. An apparatus as in claim 3, in which the said remaining symbols include one or more symbols chosen from a second further signal point constellation having a number of signal points equal to the number in the said first plurality of signal points in the first further signal point constellation.

7. An apparatus for transmission of data using quadrature amplitude modulation, said apparatus comprising:

(a) modulation means controllable to produce consecutive output symbols in each of which a carrier has selected phase and amplitude;

(b) mapping means for receiving data and controlling the modulation means in accordance with a first signal point constellation having a plurality of signal points, a first set of which, on a phase-plane plot, lie outside a predetermined boundary and a second set of which lie within said predetermined boundary, and at least one further constellation which has signal points fewer in number than those of the first constellation and lying within said predetermined boundary; and (c) frame synchronisation means operable in accordance with a predetermined framing structure so to control the mapping means that, for each symbol to be transmitted in one predetermined position of a symbol frame, a symbol is chosen from the first constellation, remaining symbols of the same frame being chosen from the at least one further constellation;

the mapping means being so arranged that the said remaining symbols of a given frame include (h−1) symbol(s) chosen from a first further signal point constellation including a first plurality of signal points which is a power of two in number and a second plurality of points which is in number 1/h times as many as the first plurality of signal points, where h is a power of two, and in which the first constellation of signal points includes (a) a first plurality of points which is in number twice as many as the first plurality of points of the first further constellation and (b) a second plurality of points which is in number twice as many as the second plurality of points of the first further constellation, a symbol chosen from the first constellation and the (h−1) symbol(s) chosen from the first further constellation being coded as a block of h symbols such that the block contains at most one symbol chosen from the second plurality of points of any of the constellations.

8. An apparatus for transmission of data using quadrature amplitude modulation, said apparatus comprising:

(a) modulation means controllable to produce consecutive output symbols in each of which a carrier has selected phase and amplitude;

(b) mapping means for receiving data and controlling the modulation means in accordance with a first signal point constellation having a plurality of signal points, a first set of which, on a phase-plane plot, lie outside a predetermined boundary and a second set of which lie within said predetermined boundary, and at least one further constellation which has signal points fewer in number than those of the first constellation and lying within said predetermined boundary; and (c) frame synchronisation means operable in accordance with a predetermined framing structure so to control the mapping means that, for each symbol to be transmitted in one predetermined position of a symbol frame, a symbol is chosen from the first constellation, remaining symbols of the same frame being chosen from the at least one further constellation;

the mapping means being so arranged that the said remaining symbols of a given frame include (h−1) symbol(s) chosen from a first further signal point constellation including a first plurality of signal points which is a power of two in number and a second plurality of points which is in number 1/h times as many as the first plurality of signal points where h is a power of two, and in which the first constellation of signal points includes (a) a first plurality of points which is in number twice as many as the first plurality of points of the first further constellation and (b) a second plurality of points which is in number twice as many as the second plurality of points of the first further constellation, a symbol chosen from the first constellation and the (h−1) symbol(s) chosen from the first further constellation being coded as a block of h symbols such that the block contains at most one symbol chosen from the second plurality of points of any of the constellations, said remaining symbols of a given frame including additional symbols h or a multiple of h in number, chosen from the first further constellation, the said additional symbols being coded in blocks of h symbols such that each block contains at most one symbol chosen from the second plurality of points in said further constellation.

9. An apparatus as in claim 7 in which h=2.

10. An apparatus as in claim 7, in which the second plurality of points in the first constellation has a higher average power than the first plurality of points thereof and in which the second plurality of points of the first further constellation has a higher average power than the first plurality of points thereof.

11. An apparatus as in claim 7 in which the said remaining symbols include one or more symbols chosen from a second further signal point constellation having a number of points therein equal to twice the number in the said first plurality of points of the first further constellation.

12. An apparatus as in claim 1 in which:

at least one of said constellations contains a number of points not equal to a power of two, and the mapping means includes base conversion means operable to receive a group of bits to be transmitted by a group of symbols and to generate from the group of bits, considered as a binary number, the digits of a mixed-base number, the base of each digit being the number of points in the particular constellation employed for selection of a respective symbol, and the mapping means being responsive for each symbol to the respective digit to select, a point from the corresponding constellation.

13. An apparatus for transmission of data using quadrature amplitude modulation, said apparatus comprising:

(a) modulation means controllable to produce consecutive output symbols in each of which a carrier has selected phase and amplitude;

(b) mapping means for receiving data and controlling the modulation means in accordance with a first signal point constellation having a plurality of signal points, a first set of which, on a phase-plane plot, lie outside a predetermined boundary and a second set of which lie within said predetermined boundary, and at least one further constellation which has signal points fewer in number than those of the first constellation and lying within said predetermined boundary; and (c) frame synchronisation means operable in accordance with a predetermined framing structure so to control the mapping means that, for each symbol to be transmitted in one predetermined position of a symbol frame, a symbol is chosen from the first constellation, remaining symbols of the same frame being chosen from the at least one further constellation;

each said constellation including a plurality $2^k$ equal to an integer power of two of subsets of signal points, each subset of a given constellation containing the same number of points, and at least one constellation having a number of points per subset not equal to a power of two, the mapping means including base conversion means operable to receive a group of bits to be transmitted by a group of symbols other than k bits for each of said symbols and to generate from the group of bits, considered as a binary number, the digits of a mixed base number, the base of each digit being the number of signal points per subset of the constellation employed for the respective symbol, and the mapping means being, for each symbol, responsive to a respective k of the bits in the group of bits to select a subset and to the respective digit to select a point within the subset.

14. An apparatus as in claim 12 in which the digit employed to select a point from the first constellation is the least significant digit of the mixed base number.

15. An apparatus as in claim 12 in which the digit employed to select a point from the first constellation is the most significant digit and the mapping means defines an assignment between the digit value and the points of the first constellation in which the smallest values of the digit correspond to the points having the larger powers.

16. An apparatus as in claim 2, in which a symbol chosen from the second further constellation occupies a position in the frame adjacent to that of the symbol chosen from the first constellation.

17. A method of transmitting data using quadrature amplitude modulation, said method comprising generating, for successive groups of bits to be transmitted, successive frames of output symbols in which a modulated carrier assumes a phase and amplitude selected from sets of allowable phase/amplitude combinations defined by signal point constellations, in which each frame comprises:

one non-redundant symbol, located at a predetermined position within the frame, chosen from a first signal point constellation having a plurality of points some of which, on a phase-plane plot, lie outside a predetermined boundary and others of which lie within it;

and a plurality of remaining symbols for the same frame chosen from at least one further signal point constellation having points which are fewer in number than those of the first constellation and which lie within the said predetermined boundary.

18. A method of transmitting data using quadrature amplitude modulation wherein each group of B bits to be transmitted is transmitted by means of A symbols, the said A symbols including:

(i) a plurality of first symbols, even in number, chosen from a first signal constellation including a first plurality of points which is a power of two in number and a second plurality of points, in number half as many as the first plurality and having a higher average power than the first plurality, the said symbols being coded in pairs such that each pair contains at most one symbol from the second plurality of points; and (ii) one or more second symbols chosen from a second signal point constellation having a number of points equal to the number in said first plurality of points;

at least some of the groups including one third symbol chosen from a third signal point constellation having a number of points equal to twice the number in the said first plurality of points, the third symbol being always located at the same predetermined position within a group.

19. A method of transmitting data using quadrature amplitude modulation wherein each group of B bits to be transmitted is transmitted by means of A symbols, the said A symbols including:

(i) a plurality of first symbols, even in number, chosen from a first signal constellation including a first plurality of points which is a power of two in number and a second plurality of points, in number half as many as the first plurality and having a higher average power than the first plurality, the said symbols being coded in pairs such that each pair contains at most one symbol from the second plurality of points;

and (ii) optionally, one or more second symbols being chosen from a second signal point constellation having a number of points equal to twice the number in the said first plurality of points, and wherein at least some of the groups include a further first symbol and a third symbol chosen from a third signal constellation including a first plurality of points in number twice as many as the first plurality of points of the first constellation and a second plurality in number twice as many as the second plurality of points of the first constellation, the further first symbol and the third symbol being coded as a pair such that the pair contains at most one symbol chosen from the second plurality of points of the corresponding constellation, the third symbol being always located at the same predetermined position within a group.

20. A method as in claim 17 in which at least one of said constellations contains a number of points not equal to a power of two, and comprising generating from a group of bits to be transmitted by a frame of symbols, the bit group being considered as a binary number, the digits of a mixed-base number, the base of each digit being the number of points in the constellation employed for selection of a respective symbol, and for each symbol selecting a point from the corresponding constellation in response to the respective digit.

21. A method of transmitting data using quadrature amplitude modulation, the method including:

transmitting symbols drawn from a first signal point constellation and from a second signal point constellation, each said constellation including a first plurality of points which is a power of two in number and a second plurality of points, in number half as many as the first plurality and having a higher average power than the first plurality, the first constellation having a larger total number of points than has the second constellation, and coding at least some of the said symbols in pairs containing one symbol chosen from the first constellation and one symbol chosen from the second constellation coded such that each pair contains at most one symbol from the second plurality of points of one of the constellations.

22. An apparatus for transmission of data using quadrature amplitude modulation, said apparatus comprising:

(a) modulation means controllable to produce output symbols in each of which a carrier has selected phase and amplitude; and (b) mapping means for receiving the data and controlling the modulation means in accordance with one or more signal point constellations having a plurality of signal points, in which at least one constellation contains a number of points not equal to a power of two, and the mapping means includes base conversion means operable to receive a group of bits to be transmitted by a group of symbols and to generate from the bit group, considered as a binary number, the digits of a non-binary number, the base of each digit being the number of points in the constellation employed for selection of a respective symbol, and the mapping means being responsive for each symbol to the respective digit to select a point from the corresponding constellation.

23. An apparatus for transmission of data using quadrature amplitude modulation, said apparatus comprising:
(a) modulation means controllable to produce output symbols in each of which a carrier has selected phase and amplitude; and
(b) mapping means for receiving the data and controlling the modulation means in accordance with at least one signal point constellation having a plurality of signal points, in which each constellation contains a plurality $2^k$ equal to an integral power of two of subsets of points, each subset of a given constellation containing the same number of points, and at least one said constellation having number of points per subset not equal to a power of two, the mapping means including base conversion means operable to receive a group of bits to be transmitted by a group of symbols other than k bits for each of said symbols and to generate from the bit group, considered as a binary number, the digits of a non-binary number, the base of each digit being the number of points per subset of the constellation employed for the respective symbol, and the mapping means being for each symbol, responsive to a respective k of the bits to select a subset and to the respective digit to select a point within the subset.

* * * * *